(12) United States Patent
Lalani et al.

(10) Patent No.: US 10,719,555 B2
(45) Date of Patent: Jul. 21, 2020

(54) SYSTEM AND METHOD IN A DATABASE SYSTEM FOR SHARING A DATA ITEM WITH AN ENTITY IN ANOTHER TENANT DOMAIN

(71) Applicant: salesforce.com, inc., San Francisco, CA (US)

(72) Inventors: Roojuta Lalani, Fremont, CA (US); Neeraj Ahuja, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 401 days.

(21) Appl. No.: 15/426,446

(22) Filed: Feb. 7, 2017

(65) Prior Publication Data

US 2018/0225317 A1    Aug. 9, 2018

(51) Int. Cl.
*G06F 16/901* (2019.01)
*G06F 16/22* (2019.01)

(52) U.S. Cl.
CPC ...... *G06F 16/9017* (2019.01); *G06F 16/2228* (2019.01)

(58) Field of Classification Search
CPC .................. G06F 16/9017; G06F 16/2228
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |

(Continued)

*Primary Examiner* — Miranda Le
(74) *Attorney, Agent, or Firm* — LKGlobal | Lorenz & Kopf, LLP

(57) ABSTRACT

A method for providing access to a data item in a multi-tenant database system is disclosed. The method comprises storing a data item as a first data object in a first tenant domain in the database system wherein the data item comprises a knowledge-based item and the first data object has a first data object identifier (ID). The method further comprises generating a platform object with polymorphic lookup, storing database ID information for the data item in the platform object, the database ID information for the data item including the first data object ID, providing a first entity in a second tenant domain with access to the data item by linking the platform object to a first tenant-specific object accessible by the first entity, and providing for display in a user interface a link that is mapped to the data item via the platform object and the first tenant-specific object.

17 Claims, 7 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,047,228 B1 * | 5/2006 | Murphy ............... G06Q 10/087 |
| 7,062,502 B1 | 6/2006 | Kesler |
| 7,069,231 B1 | 6/2006 | Cinarkaya et al. |
| 7,181,758 B1 | 2/2007 | Chan |
| 7,206,820 B1 * | 4/2007 | Rhoads ............... G06Q 30/06 |
| | | 709/217 |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,707,149 B2 * | 4/2010 | Lee ................... G06Q 30/00 |
| | | 707/999.01 |
| 7,779,475 B2 | 8/2010 | Jakobson et al. |
| 7,930,318 B2 * | 4/2011 | Becker .............. G06F 16/958 |
| | | 707/795 |
| 7,933,869 B2 * | 4/2011 | Becker .............. G06F 16/275 |
| | | 707/625 |
| 8,014,943 B2 | 9/2011 | Jakobson |
| 8,015,495 B2 | 9/2011 | Achacoso et al. |
| 8,032,297 B2 | 10/2011 | Jakobson |
| 8,051,102 B2 * | 11/2011 | Everett .............. G06F 16/284 |
| | | 707/793 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 3,275,836 A1 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,583,680 B2 * | 11/2013 | Hoang ................. G06Q 10/10 |
| | | 707/769 |
| 8,620,756 B2 * | 12/2013 | Fuisz .................. G06Q 30/02 |
| | | 705/27.1 |
| 8,646,103 B2 | 2/2014 | Jakobson et al. |
| 9,015,177 B2 * | 4/2015 | Cahill ................. G06F 16/27 |
| | | 707/756 |
| 9,183,230 B2 * | 11/2015 | Chitiveli ............. G06F 16/27 |
| 9,250,941 B2 * | 2/2016 | Kempf ............... G06F 9/45533 |
| 9,626,440 B2 * | 4/2017 | Meyerzon ........... G06F 16/9535 |
| 9,665,394 B2 * | 5/2017 | Antani .................. G06F 9/468 |
| 9,710,523 B2 * | 7/2017 | Skurtovich, Jr. ..... G06Q 40/02 |
| 10,127,250 B2 * | 11/2018 | Dingman ........... G06F 16/211 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0027611 A1 * | 2/2005 | Wharton ............. G06Q 30/06 |
| | | 705/26.62 |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0017265 A1 * | 1/2010 | Weingarten ........... G06Q 30/02 |
| | | 705/7.29 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |

(56) References Cited

U.S. PATENT DOCUMENTS

| | | | |
|---|---|---|---|
| 2012/0233147 A1* | 9/2012 | Solheim | G06F 16/2272 |
| | | | 707/709 |
| 2013/0204894 A1* | 8/2013 | Faith | G06Q 30/0631 |
| | | | 707/769 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2013/0254882 A1* | 9/2013 | Kannappan | G06Q 10/10 |
| | | | 726/22 |
| 2014/0379414 A1* | 12/2014 | Kumar | G06Q 10/06316 |
| | | | 705/7.26 |
| 2016/0173475 A1* | 6/2016 | Srinivasan | G06Q 10/06315 |
| | | | 726/6 |
| 2016/0261716 A1* | 9/2016 | Khalaf | H04L 67/1002 |

* cited by examiner

SYSTEM AND METHOD IN A DATABASE SYSTEM FOR SHARING A DATA ITEM WITH AN ENTITY IN ANOTHER TENANT DOMAIN

TECHNICAL FIELD

Embodiments of the subject matter described herein relate generally to computer systems, and more particularly, to methods and systems for providing access to data items stored in a database system.

BACKGROUND

Many organizations are moving toward cloud-based services and infrastructure to provide on-demand services. Many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over the network "as a service" supplied by the infrastructure provider.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database").

A multi-tenant system stores data as objects. Tenants may be allowed to create and store custom objects, or they may be allowed to customize standard objects, for example, by creating custom fields for standard objects.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The subject matter described herein discloses apparatus, systems, techniques and articles that may provide user access to data items not stored in the tenant domain of the user. In some examples, apparatus, systems, techniques and articles disclosed herein utilize a platform object having polymorphic lookup capability that can map to multiple tenant domains to provide user access to data items not stored in the tenant domain of the user. In some examples, systems and methods disclosed herein link a tenant-specific object in a tenant domain to a data item stored in a different tenant domain using the platform object.

Figure 1:
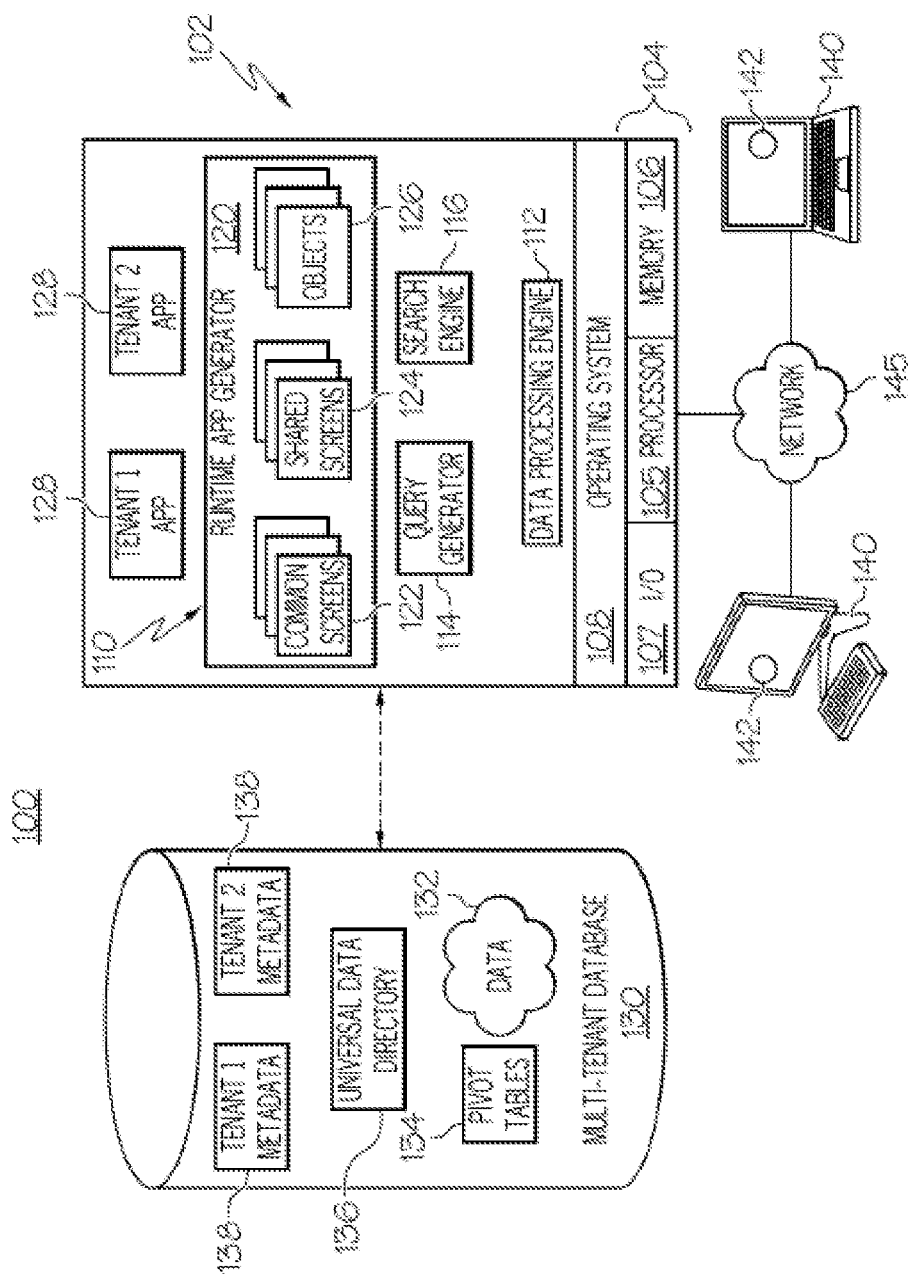
FIG. 1 is a block diagram depicting an exemplary embodiment of an on-demand multi-tenant database system.

FIG. 1 and the following discussion are intended to provide a brief, general description of one non-limiting example of an example environment in which the embodiments described herein may be implemented. Those skilled in the art will appreciate that the embodiments described herein may be practiced with other computing environments.

FIG. 1 depicts an exemplary embodiment of an on-demand multi-tenant database system 100. The illustrated multi-tenant system 100 of FIG. 1 includes a server 102 that dynamically creates and supports virtual applications 128 based upon data 132 from a common database 130 that is shared between multiple tenants, alternatively referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users or entities that shares access to common subset of the data within the multi-tenant database 130. In this regard, each tenant includes one or more users associated with, assigned to, or otherwise belonging to that respective tenant. To put it another way, each respective user within the multi-tenant system 100 is associated with, assigned to, or otherwise belongs to a particular tenant of the plurality of tenants supported by the multi-tenant system 100. Tenants may represent customers, customer departments, business or legal organizations, and/or any other entities that maintain data for particular sets of users within the multi-tenant system 100 (i.e., in the multi-tenant database 130). For example, the application server 102 may be associated with one or more tenants supported by the multi-tenant system 100. Although multiple tenants may share access to the server 102 and the database 130, the particular data and services provided from the server 102 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 132 belonging to or otherwise associated with other tenants.

The multi-tenant database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128. The multi-tenant database 130 may alternatively be referred to herein as an on-demand database, in that the multi-tenant database 130 provides (or is available to provide) data at run-time to on-demand virtual applications 128 generated by the application platform 110.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or application platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multitenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request. In this manner, the query generator 114 suitably obtains requested subsets of data 132 accessible to a user and/or tenant from the database 130 as needed to populate the tables, reports or other features of the particular virtual application 128 for that user and/or tenant.

Still referring to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 126 such as "account" objects, "opportunity" objects, "contact" objects, or the like. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired.

A data item, such as a knowledge article, stored by one tenant (e.g., one department in a company) may be relevant to another tenant (e.g., a different department in the same company. One way of providing a user in another tenant domain with access to the article is to store a second instance of the article in the tenant domain of the second tenant. The apparatus, systems, techniques and articles described herein provide another way of providing a user in another tenant domain with access to the article without wasting resources by storing a second copy.

Figure 2:
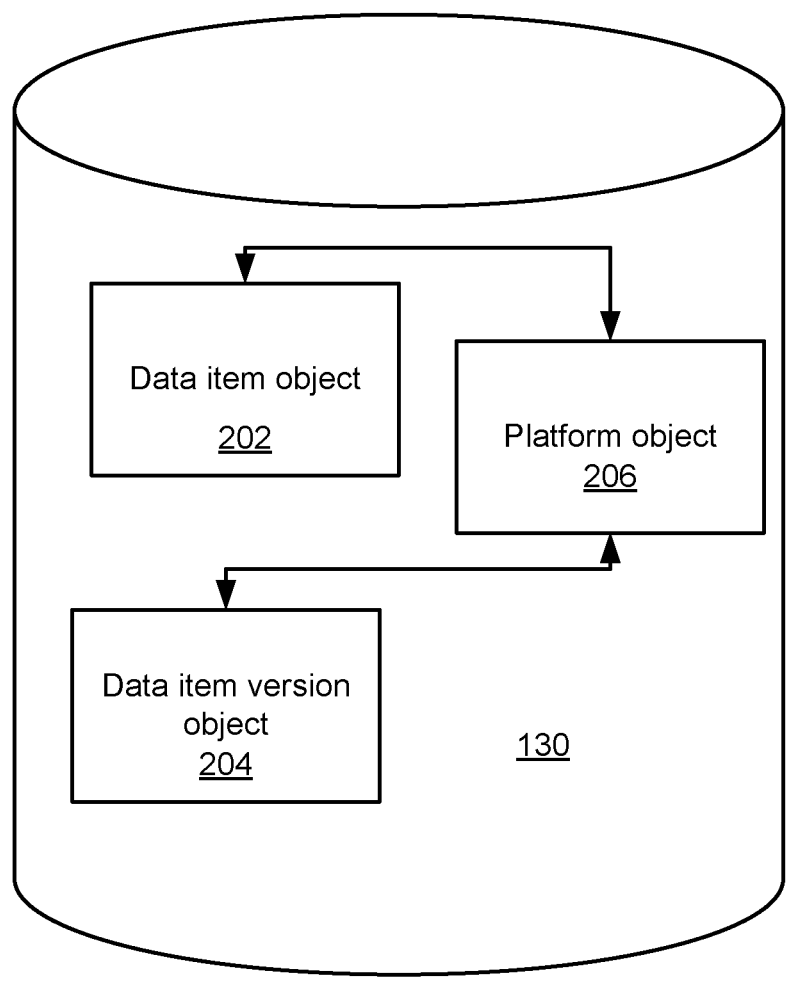
FIG. 2 is a block diagram depicting example data items that may be stored in a multi-tenant database.

FIG. 2 depicts a block diagram illustrating example data items that may be stored in a multi-tenant database such as example multi-tenant database 130. The example database 130 stores, among other things, a plurality of objects. The objects include a data item object 202, a data item version object 204, and a platform object 206. A data item (e.g., a knowledge article) may be stored in the data item object 202 in the database 130. The data item object 202 in this example, in addition to storing the knowledge article, includes a unique global universal identifier (GUID) that the database uses to identify the data object. The data item object 202 in this example also includes an organization identifier (OrgID) that the database uses to identify the database tenant that owns and/or has access to the data item object (i.e., identify the tenant domain to which the data item object belongs). The multi-tenant database will attempt to keep the data item secure and insulated from the activity of other tenants by insulating the data item object 202 from a query by an entity in another tenant domain.

A knowledge-based item may be an example data item. Knowledge-based items include items that provide information to a consumer of the knowledge-based item. Examples of knowledge-based items include articles, videos, tutorials, images, technical manuals, technical specifications, installation guides, reference material, and others.

There may be times when it may be beneficial to share a data item such as a knowledge-based item with an unidentified entity in another tenant domain. As an example, an organization may have multiple departments, each having their own tenant domain. For example, an engineering department may store a knowledge article regarding how to repair a product in its tenant domain in the database. The knowledge article may be useful for repair technicians in a repair department that has a separate tenant domain in the database. Aspects of the disclosed subject matter provides a novel way of sharing the engineering department's knowledge article with an unidentified technician in the repair department.

Figure 3:
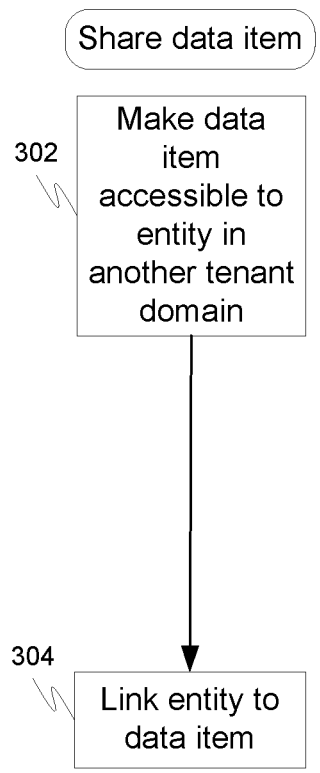
FIG. 3 is a process flow chart depicting an example process for sharing a data item owned by one tenant with an entity in another tenant domain.

FIG. 3 depicts a process flow chart illustrating an example process for sharing a data item owned by one tenant with an entity in another tenant domain. The example process depicted in FIG. 3 includes operations to make the data item accessible to an unidentified entity in another tenant domain (operation 302). After the data item is made accessible, the example process includes operations to connect an entity in the other tenant domain(s) to which the data item has been made accessible with the data item (operation 304).

Figure 4:
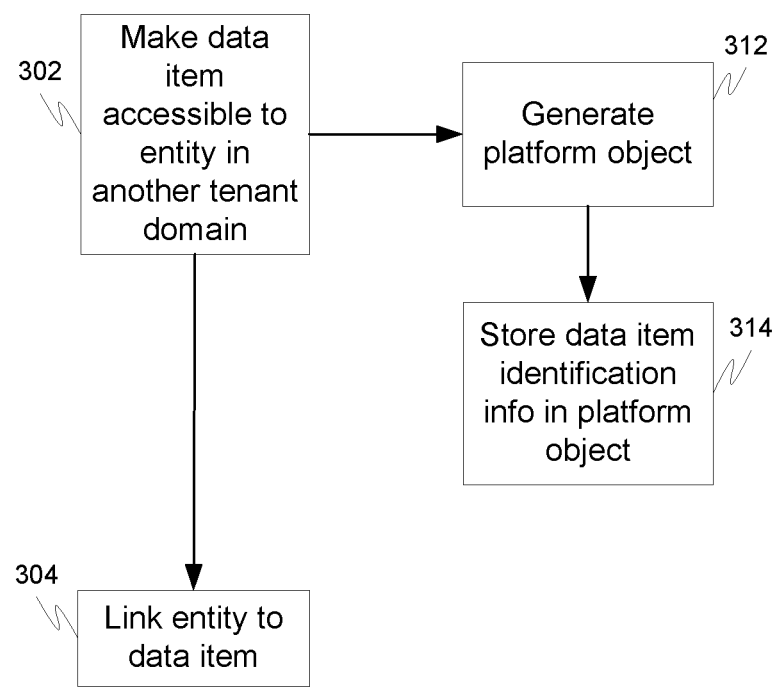
FIG. 4 is a process flow chart depicting another example process for sharing a data item owned by one tenant with an entity in another tenant domain.

FIG. 4 depicts a process flow chart illustrating another example process for sharing a data item owned by one tenant with an entity in another tenant domain. This example process includes operations similar to operations of the example process of FIG. 3. In particular, this example includes operations to make the data item accessible to an unidentified entity in another tenant domain (operation 302). After the data item is made accessible, the example process includes operations to connect an entity in the other tenant domain(s) to which the data item has been made accessible with the data item (operation 304).

Additionally, in this example, operations to make the data item accessible to an unidentified entity in another tenant domain (operation 302) includes generating a platform object (operation 312). Access to the platform object, unlike other objects, is not restricted to one specific tenant domain. The platform object has polymorphic lookup properties that allow it to be searchable in multiple tenant domains, i.e., the platform object can be subject to a query from multiple tenant domains, and can map to multiple tenant domains.

With reference to FIG. 2, a platform object 206 can be generated for the data item object 202 (e.g., a knowledge article). The example platform object 206 has a first record for storing the database ID of the data item object (e.g., its unique GUID) and a second record for storing the database ID (e.g., unique GUID) of a second data item object 204, if one exists that is related to the data item. In the example of the data item being a knowledge article, a data item version object 204 (e.g., a knowledge article version object) may exist that stores the identification of the version of the knowledge article stored in the knowledge article object 202. The example platform object also has a database ID (e.g., unique GUID) and a third record for recording the database ID of one or more tenant-specific objects that may be mapped to the platform object.

After, the platform object is generated, the example process depicted in FIG. 4 includes operations to store data item identification information in the platform object (operation 314). With reference to FIG. 2, the data item identification information stored may include identification information for the data item object 202 and the data item version object 204. The identification information, in this example, specifically includes the GUID of the data object 202 and the GUID of the data version object 204.

Thus, after performance of operations 312 and 314, the data item is made accessible to an entity in another tenant domain. The platform object 206 is searchable in multiple tenant domains and contains the database ID for the data item object and the data item version object.

Figure 5:
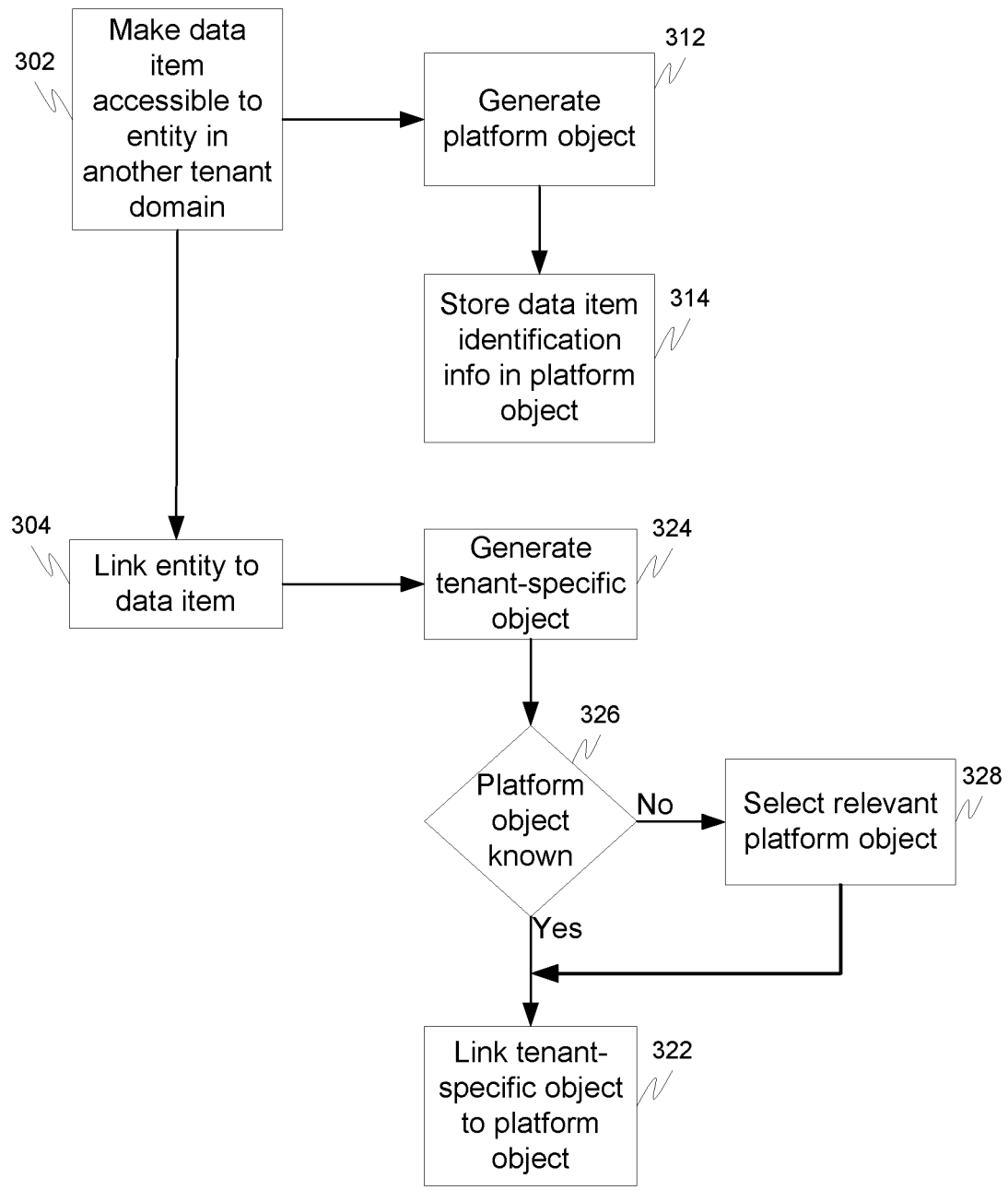
FIG. 5 is a process flow chart depicting an example process for sharing a data item owned by one tenant with an entity in another tenant domain.

FIG. 5 depicts a process flow chart illustrating another example process for sharing a data item owned by one tenant with an entity in another tenant domain. This example process includes operations similar to operations of the example process of FIG. 4. In particular, this example includes operations to make the data item accessible to an unidentified entity in another tenant domain (operation 302). After the data item is made accessible, the example process includes operations to connect an entity in the other tenant domain(s) to which the data item has been made accessible with the data item (operation 304). The operations to make the data item accessible to an unidentified entity in another tenant domain (operation 302) includes generating a platform object (operation 312) and operations to store data item identification information in the platform object (operation 314).

Additionally, in this example, operations to connect an entity in the other tenant domain(s) to which the data item has been made accessible with the data item include linking a tenant-specific object to the platform object (operation 322). In the example of a knowledge article being stored as the data item, an example tenant-specific object that one may want to link to the knowledge article data item object may be a work order object. For example, an outstanding work order for a repair may exist. To assist a repair technician (i.e., entity), the knowledge article can be shared with the repair technician. The repair technician can access a work order stored in a work order object. When the work order object (i.e., tenant-specific object) is linked to the knowledge article platform object, the knowledge article by the associations in the platform object is linked to the work order object. A user interface accessed by the repair technician can provide a mechanism such as an icon or other type of link for the repair technician to select to access the knowledge article. Access to the knowledge article could include displaying the knowledge article within the screen displaying the user interface, the option to download the knowledge article, the option to email the knowledge article or other access methods.

Before linking a tenant-specific object to the platform object, as illustrated in the example of FIG. 5, the tenant-specific object may need to be generated (operation 324). After a tenant-specific object is generated, a determination as to whether the platform object is known is made (decision operation 326). If it is determined that the platform object is known, the tenant-specific object can be linked to the platform object (operation 322). If it is determined that the platform object is not known, a search for the platform object is made and the relevant platform object is selected (operation 328) before the tenant-specific object can be linked to the platform object (operation 322).

Figure 6:
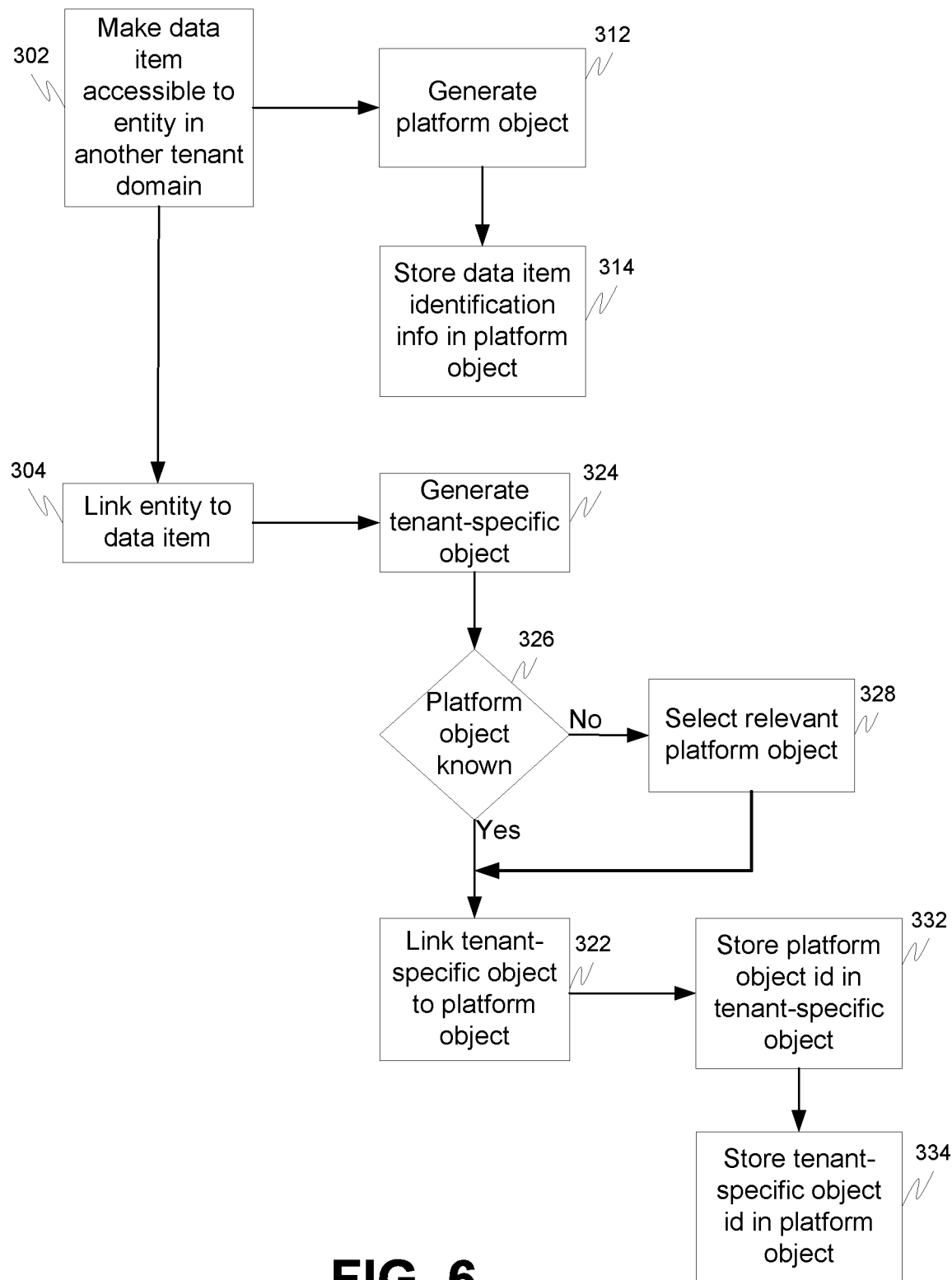
FIG. 6 is a process flow chart depicting another example process for sharing a data item owned by one tenant with an entity in another tenant domain.

FIG. 6 depicts a process flow chart illustrating another example process for sharing a data item owned by one tenant with an entity in another tenant domain. This example process includes operations similar to that of the example process of FIG. 5.

Additionally, in this example, operations to link a tenant-specific object to the platform object include storing the database ID of the platform object (e.g., GUID) in a record in the tenant-specific object (operation 332) and storing the database ID of the tenant-specific object in a record of the platform object (operation 334). The order of the performance of operation 332 and operation 334 is not important. For example, operation 332 may be performed before operation 334, operation 334 may be performed before operation 332, or operation 332 and operation 334 may be performed in parallel.

Figure 7:
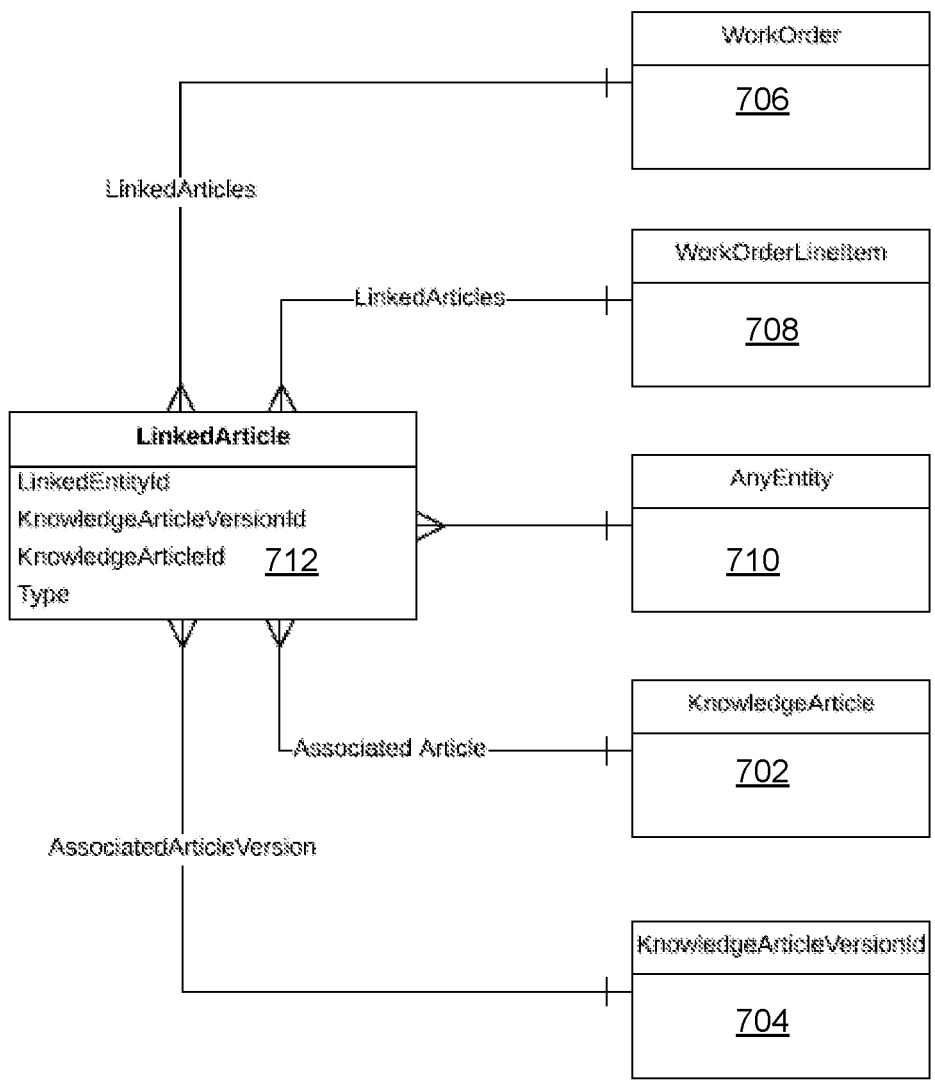
FIG. 7 is a block diagram depicting example connections between example linked objects in multiple tenant domains.

FIG. 7 depicts a block diagram illustrating example connections between example linked objects in multiple tenant domains. In this example, a knowledge article is stored in a KnowledgeArticle object 702 and the version identification of the knowledge article is stored in the KnowledgeArticleVersionId object 704. The KnowledgeArticle object 702 and the KnowledgeArticleVersionId object 704 exist in a first tenant domain. Work order data is stored in a WorkOrder object 706 in a second tenant domain, a line item of the work order is stored in a WorkOrderLineItem object 708 in a third tenant domain, and an AnyEntity object 710 is in a fourth tenant domain. A platform object, LinkedArticle object 712, with polymorphic lookup is provided in the database.

The LinkedArticle object 712 is mapped to each of KnowledgeArticle object 702, KnowledgeArticleVersionId object 704, WorkOrder object 706, WorkOrderLineItem object 708, and AnyEntity object 710. The LinkedArticle object 712 includes a record, LinkedEntityId, for recording the database ID of each tenant-specific object (WorkOrder object 706, WorkOrderLineItem object 708, and AnyEntity object 710) linked to the knowledge article. The LinkedArticle object 712 also includes a record, KnowledgeArticleVersionId, for recording the database ID of the KnowledgeArticleVersionId object 704 and a record, KnowledgeArticleId, for recording the database ID of the KnowledgeArticle object 702. The LinkedArticle object 712 also includes a record, Type, for identifying the LinkedArticle object 712 as a platform object.

The LinkedArticle object 712 provides an entity accessing a tenant-specific object with access to the knowledge article and version information through a tenant-specific object's connection to the LinkedArticle object 712 and its connection to the KnowledgeArticle object 702 and the KnowledgeArticleVersionId object 704.

A user interface accessed by an entity may provide for display a computer selectable link that is mapped to the specific version of the data item via the platform object and a tenant-specific object. Access to the knowledge article could include displaying the knowledge article within the screen displaying the user interface, the option to download the knowledge article, the option to email the knowledge article or other access methods. In response to actuating the link, the database may provide a copy of the specific version of the data item to the entity for display and additionally or alternatively provide for display a listing identifying other tenant-specific objects linked to the data item via the platform object.

The apparatus, systems, techniques and articles described herein may provide user access to data items not stored in the tenant domain of the user. In some examples, apparatus, systems, techniques and articles disclosed herein utilize a platform object having polymorphic lookup capability that can map to multiple tenant domains to provide user access to data items not stored in the tenant domain of the user. In some examples, systems and methods disclosed herein link a tenant-specific object in a tenant domain to a data item stored in a different tenant domain using the platform object.

In one embodiment, a method in a multi-tenant database system for providing access to a data item not associated with a tenant is disclosed. The method comprises storing a data item as a first data object in a first tenant domain in the multi-tenant database system wherein the data item comprises a knowledge-based item and the first data object has a first data object identifier (ID). The method further comprises generating for the data item a platform object with polymorphic lookup that can map to multiple tenant domains, storing database ID information for the data item in the platform object, the database ID information for the data item including the first data object ID, and providing a first entity in a second tenant domain with access to the data item by linking the platform object to a first tenant-specific object accessible by the first entity. Also, the method comprises providing for display in a first user interface for the first entity a first link that is mapped to the data item via the platform object and the first tenant-specific object.

These aspects and other embodiments may include one or more of the following features. The method may further comprise storing version information identifying the specific version of the data item in a second data object in the first tenant domain, the second data object having a second data object ID and the database ID information for the data item may further comprise the second data object ID. The platform object may comprise a first record for storing the first data object ID, a second record for storing the second data object ID, a third record for recording the database ID of one or more tenant-specific objects mapped to the platform object, and a platform object ID. Linking the platform object to a first tenant-specific object accessible by the first entity may comprise storing the platform object ID in the first tenant-specific object and storing the database ID of the first tenant-specific object in the platform object. The method may further comprise providing a copy of the data item to the first entity for display in response to actuation of the first link. The method may further comprise providing for display a first listing identifying other tenant-specific objects linked to the data item via the platform object in response to actuation of the first link. The method may further comprise providing a second entity in a third tenant domain with access to the data item by linking the platform object to a second tenant-specific object accessible by the second entity and providing for display in a second user interface for the second entity a second link that is mapped to the data item via the platform object and the second tenant-specific object. Linking the platform object to a second tenant-specific object accessible by the second entity may comprise storing the platform object ID in the second tenant-specific object and storing the database ID of the second tenant-specific object in the platform object. The method may further comprise providing a copy of the data item to the second entity for display in response to actuation of the second link. The method may further comprise providing for display a second listing that identifies the first tenant-specific object in response to actuation of the second link.

In another embodiment, a multi-tenant database system is disclosed. The system comprises a hardware processor and non-transient computer readable media coupled to the processor. The non-transient computer readable media comprises instructions that when executed by the processor cause the database system to generate a platform object with polymorphic lookup that can map to multiple tenant domains for a data item stored as a first data object in a first tenant domain in the multi-tenant database system. The first data object has a first data object identifier (ID). The non-transient computer readable media further comprises instructions that when executed by the processor cause the database system to store database ID information for the data item in the platform object. The database ID information for the data item includes the first data object id. The non-transient computer readable media further comprises instructions that when executed by the processor cause the database system to provide a first entity in a second tenant domain with access to the data item by linking the platform object to a first tenant-specific object accessible by the first entity and provide for display in a first user interface for the first entity a first link that is mapped to the data item via the platform object and the first tenant-specific object.

These aspects and other embodiments may include one or more of the following features. The system may further comprise instructions that when executed by the processor cause the database system to store version information identifying the specific version of the data item in a second data object in the first tenant domain. The second data object has a second data object id. The database ID information for the data item may further comprise the second data object ID. The platform object may comprise a first record for storing the first data object ID, a second record for storing the second data object ID, a third record for recording the database ID of one or more tenant-specific objects mapped to the platform object, and a platform object ID. The instructions when executed by the processor may further cause the database system to store the platform object ID in the first tenant-specific object and storing the database ID of the first tenant-specific object in the platform object. The system may further comprise instructions that when executed by the processor cause the database system to provide a copy of the data item to the first entity for display in response to actuation of the first link. The system may further comprise instructions that when executed by the processor cause the database system to provide for display a first listing identifying other tenant-specific objects linked to the data item via the platform object in response to actuation of the first link. The system may further comprise instructions that when executed by the processor cause the database system to provide a second entity in a third tenant domain with access to the data item by linking the platform object to a second tenant-specific object accessible by the second entity and provide for display in a second user interface for the second entity a second link that is mapped to the data item via the platform object and the second tenant-specific object. The instructions when executed by the processor may further cause the database system to store the platform object ID in the second tenant-specific object and store the database ID of the second tenant-specific object in the platform object. The system may further comprise instructions that when executed by the processor cause the database system to provide a copy of the data item to the second entity for display in response to actuation of the second link. The system may further comprise instructions that when executed by the processor cause the database system to provide for display, in response to actuation of the second link, a second listing that identifies the first tenant-specific object.

In another embodiment, a non-transient computer readable storage media comprising computer instructions is disclosed. The computer instructions when executed by a hardware processor in a multi-tenant database system cause the database system to implement a method comprising storing a data item as a first data object in a first tenant domain in the multi-tenant database system wherein the first data object has a first data object identifier (ID). The method further comprises generating for the data item a platform object with polymorphic lookup that can map to multiple tenant domains, storing database ID information for the data item in the platform object, the database ID information for the data item including the first data object ID, and providing a first entity in a second tenant domain with access to the data item by linking the platform object to a first tenant-specific object accessible by the first entity. Also, the method comprises providing for display in a first user interface for the first entity a first link that is mapped to the data item via the platform object and the first tenant-specific object.

These aspects and other embodiments may include one or more of the following features. The method may further comprise storing version information identifying the specific version of the data item in a second data object in the first tenant domain, the second data object having a second data object ID and the database ID information for the data item may further comprise the second data object ID. The platform object may comprise a first record for storing the first data object ID, a second record for storing the second data object ID, a third record for recording the database ID of one or more tenant-specific objects mapped to the platform object, and a platform object ID. Linking the platform object to a first tenant-specific object accessible by the first entity may comprise storing the platform object ID in the first tenant-specific object and storing the database ID of the first tenant-specific object in the platform object. The method may further comprise providing a copy of the data item to the first entity for display in response to actuation of the first link. The method may further comprise providing for display a first listing identifying other tenant-specific objects linked to the data item via the platform object in response to actuation of the first link. The method may further comprise providing a second entity in a third tenant domain with access to the data item by linking the platform object to a second tenant-specific object accessible by the second entity and providing for display in a second user interface for the second entity a second link that is mapped to the data item via the platform object and the second tenant-specific object. Linking the platform object to a second tenant-specific object accessible by the second entity may comprise storing the platform object ID in the second tenant-specific object and storing the database ID of the second tenant-specific object in the platform object. The method may further comprise providing a copy of the data item to the second entity for display in response to actuation of the second link. The method may further comprise providing for display a second listing that identifies the first tenant-specific object in response to actuation of the second link.

In yet another embodiment, a method in a multi-tenant database system for providing access to a data item not associated with a tenant is disclosed. The method comprises storing a data item as a first data object in the multi-tenant database system. The data item comprises a knowledge-based item and the first data object has a first data object identifier (ID). The method further comprises storing version information identifying the specific version of the data item in a second data object in the multi-tenant database system. The second data object has a second data object id. The method further comprises generating for the data item a platform object with polymorphic lookup that can map to multiple tenant domains. The platform object has a first record for storing the first data object ID, a second record for storing the second data object ID, a third record for recording the database ID of one or more tenant-specific objects mapped to the platform object, and a platform object ID. The method further comprises storing database ID information for the data item in the platform object by storing the first data object ID in the first record and storing the second data object ID in the second record. The method further comprises, responsive to a request to provide a first entity in a first tenant domain with access to the data item, linking a first tenant-specific object in the first tenant domain to the data item via the platform object by storing the platform object ID in the first tenant-specific object and storing the database ID of the first tenant-specific object in the third record of the platform object and providing for display in a first user interface for the first entity a first link that is mapped to the specific version of the data item via the platform object and the first tenant-specific object. The method further comprises, responsive to actuation of the first link, providing a copy of the specific version of the data item to the first entity for display and providing for display a first listing identifying other tenant-specific objects linked to the data item via the platform object. The method further comprises, responsive to a request to provide a second entity in a second tenant domain with access to the data item, linking a second tenant-specific object in the second tenant domain to the data item via the platform object by storing the platform object ID in a second tenant-specific object and storing the database ID of the second tenant-specific object in the third record of the platform object and providing for display in a second user interface for the second entity a second link that is mapped to the specific version of the data item via the platform object and the second tenant-specific object. The method further comprises, responsive to actuation of the second link, providing a copy of the specific version of the data item to the second entity for display and providing for display a second listing identifying other tenant-specific objects linked to the data item via the platform object.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, lookup tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method in a multi-tenant database system for providing access to a data item not associated with a tenant, the method comprising:

generating, a first data object associated with a first tenant domain that is accessible in the first tenant domain but not in a second tenant domain, a second data object associated with the second tenant domain that is accessible in the second tenant domain but not in the first tenant domain, and a third data platform object with polymorphic lookup capability that allows the third data platform object to be accessible in both the first and second tenant domain, wherein the first, second, and third data platform objects are different data objects and wherein each has a database identifier (ID) for identifying the data object within the multi-tenant database system that is different from the database ID for the other data objects, wherein the multi-tenant database system provides the first tenant domain and the second tenant domain, wherein a data object associated with the first tenant domain is accessible via a search or a query to a database user having access rights in the first tenant domain but not having access rights in the second tenant domain, wherein the data object associated with the first tenant domain is not accessible via a search or a query to a second database user having access rights in the second tenant domain but not having access rights in the first tenant domain, and wherein a data object associated with the second tenant domain is accessible via a search or a query to the second database user but is not accessible via a search or a query to the first database user;

storing a knowledge-based data item in the first data object;

making the knowledge-based data item that is accessible in the first tenant domain, but not accessible via a search or a query in a second tenant domain, accessible to the second database user with access to the second tenant domain but not access to the first tenant domain by:

storing the database ID for the first data object in the third data platform object, thereby establishing a link between the third data platform object and the first data object; and storing the database ID for the third data platform object in the second data object, thereby establishing a link between the second data object and the third data platform object, wherein the knowledge-based data item stored in the first data object in the first tenant domain is accessible to the second database user having access to the second tenant domain and not the first tenant domain through the link between the second data object and the third data platform object and the link between the third data platform object and the first data object;

storing version information identifying the specific version of the knowledge-based data item in a version data object in the first tenant domain, the version data object having a database ID;

storing the database ID for the version data object in the third data platform object;

displaying, in a user interface accessible by the second database user responsive to a search or query for the knowledge-based data item, a selectable link that is mapped to the knowledge-based data item stored in the first data object in the first tenant domain via the second data object and the third data platform object, the link when actuated causing the knowledge-based data item to be displayed in the user interface; and responsive to actuation of the selectable link, providing a copy of the knowledge-based data item and a listing identifying other data objects linked to the knowledge-based data item via the third data platform object for display in the user interface.

2. The method of claim 1 wherein the third data platform object comprises a first record for storing the database ID for the first data object, a second record for storing the database ID for the version data object, and a third record for recording the database ID for the second data object.

3. The method of claim 2 further comprising:
storing the database ID for the second data object in the third record.

4. The method of claim 3 further comprising:
providing a third database user in a third tenant domain with access to the knowledge-based data item by storing the database ID of the third data platform object in a fourth data object and storing the database ID of the fourth data object in the third record; and
displaying in a user interface for the third database user a second link that is mapped to the knowledge-based data item via the third data platform object and the fourth data object.

5. The method of claim 4 further comprising: responsive to actuation of the second link providing a copy of the knowledge-based data item to the third database user for display.

6. The method of claim 5 further comprising: responsive to actuation of the second link displaying a second listing that identifies the second data object.

7. A multi-tenant database system comprising a hardware processor and non-transitory computer readable media coupled to the processor, the non-transitory computer readable media encoded with programming instructions that when executed by the processor causes the database system to perform a method, the method comprising:
generating, a first data object associated with a first tenant domain that is accessible in the first tenant domain but not in a second tenant domain, a second data object associated with the second tenant domain that is accessible in the second tenant domain but not in the first tenant domain, and a third data platform object with polymorphic lookup capability that allows the third data platform object to be accessible in both the first and second tenant domain, wherein the first, second, and third data platform objects are different data objects and wherein each has a database identifier (ID) for identifying the data object within the multi-tenant database system that is different from the database ID for the other data objects, wherein the multi-tenant database system provides the first tenant domain and the second tenant domain, wherein a data object associated with the first tenant domain is accessible via a search or a query to a database user having access rights in the first tenant domain but not having access rights in the second tenant domain, wherein the data object associated with the first tenant domain is not accessible via a search or a query to a second database user having access rights in the second tenant domain but not having access rights in the first tenant domain, and wherein a data object associated with the second tenant domain is accessible via a search or a query to the second database user but is not accessible via a search or a query to the first database user;

storing a knowledge-based data item in the first data object;

making the knowledge-based data item that is accessible in the first tenant domain, but not accessible via a search or a query in a second tenant domain, accessible to the second database user with access to the second tenant domain but not access to the first tenant domain by:
storing the database ID for the first data object in the third data platform object, thereby establishing a link between the third data platform object and the first data object; and
storing the database ID for the third data platform object in the second data object, thereby establishing a link between the second data object and the third data platform object, wherein the knowledge-based data item stored in the first data object in the first tenant domain is accessible to the second database user having access to the second tenant domain and not the first tenant domain through the link between the second data object and the third data platform object and the link between the third data platform object and the first data object;

storing version information identifying the specific version of the knowledge-based data item in a version data object in the first tenant domain, the version data object having a database ID;

storing the database ID for the version data object in the third data platform object;

displaying, in a user interface accessible by the second database user responsive to a search or query for the knowledge-based data item, a selectable link that is mapped to the knowledge-based data item stored in the first data object in the first tenant domain via the second data object and the third data platform object, the link when actuated causing the knowledge-based data item to be displayed in the user interface; and responsive to actuation of the selectable link, providing a copy of the knowledge-based data item and a listing identifying other data objects linked to the knowledge-based data item via the third data platform object for display in the user interface.

8. The system of claim 7 wherein the third data platform object comprises a first record for storing the database ID for the first data object, a second record for storing the database ID for the version data object, and a third record for recording the database ID for the second data object.

9. The system of claim 7 wherein the method further comprises storing the database ID for the second data object in the third record.

10. The system of claim 9 wherein the method further comprises:
 providing a third database user in a third tenant domain with access to the knowledge-based data item by storing the database ID of the third data platform object in a fourth data object and storing the database ID of the fourth data object in the third record; and
 displaying in a user interface for the third database user a second link that is mapped to the knowledge-based data item via the third data platform object and the fourth data object.

11. The system of claim 10 wherein the method further comprises:
 providing a copy of the knowledge-based data item to the third database user for display in response to actuation of the second link; and
 displaying, in response to actuation of the second link, a second listing that identifies the second data object.

12. A non-transitory computer readable storage media encoded with computer instructions configurable to cause a hardware processor in a multi-tenant database system to implement a method comprising:
 generating, a first data object associated with a first tenant domain that is accessible in the first tenant domain but not in a second tenant domain, a second data object associated with the second tenant domain that is accessible in the second tenant domain but not in the first tenant domain, and a third data platform object with polymorphic lookup capability that allows the third data platform object to be accessible in both the first and second tenant domain, wherein the first, second, and third data platform object s are different data objects and wherein each has a database identifier (ID) for identifying the data object within the multi-tenant database system that is different from the database ID for the other data objects, wherein the multi-tenant database system provides the first tenant domain and the second tenant domain, wherein a data object associated with the first tenant domain is accessible via a search or a query to a database user having access rights in the first tenant domain but not having access rights in the second tenant domain, wherein the data object associated with the first tenant domain is not accessible via a search or a query to a second database user having access rights in the second tenant domain but not having access rights in the first tenant domain, and wherein a data object associated with the second tenant domain is accessible via a search or a query to the second database user but is not accessible via a search or a query to the first database user;
 storing a knowledge-based data item in the first data object;
 making the knowledge-based data item that is accessible in the first tenant domain, but not accessible via a search or a query in a second tenant domain, accessible to the second database user with access to the second tenant domain but not access to the first tenant domain by:
  storing the database ID for the first data object in the third data platform object, thereby establishing a link between the third data platform object and the first data object; and
  storing the database ID for the third data platform object in the second data object, thereby establishing a link between the second data object and the third data platform object, wherein the knowledge-based data item stored in the first data object in the first tenant domain is accessible to the second database user having access to the second tenant domain and not the first tenant domain through the link between the second data object and the third data platform object and the link between the third data platform object and the first data object;
 storing version information identifying the specific version of the knowledge-based data item in a version data object in the first tenant domain, the version data object having a database ID;
 storing the database ID for the version data object in the third data platform object;
 displaying, in a user interface accessible by the second database user responsive to a search or query for the knowledge-based data item, a selectable link that is mapped to the knowledge-based data item stored in the first data object in the first tenant domain via the second data object and the third data platform object, the link when actuated causing the knowledge-based data item to be displayed in the user interface; and
 responsive to actuation of the selectable link, providing a copy of the knowledge-based data item and a listing identifying other data objects linked to the knowledge-based data item via the third data platform object for display in the user interface.

13. The non-transitory computer readable storage media of claim 12, wherein the third data platform object comprises a first record for storing the database ID for the first data object, a second record for storing the database ID for the version data object, and a third record for recording the database ID for the second data object.

14. The non-transitory computer readable storage media of claim 13, wherein the method further comprises:
 storing the database ID for the second data object in the third record.

15. The non-transitory computer readable storage media of claim 14, wherein the method further comprises:
 providing a third database user in a third tenant domain with access to the knowledge-based data item by storing the database ID of the third data platform object in a fourth data object and storing the database ID of the fourth data object in the third record; and
 displaying in a user interface for the third database user a second link that is mapped to the knowledge-based data item via the third data platform object and the fourth data object.

16. The non-transitory computer readable storage media of claim 15, wherein the method further comprises responsive to actuation of the second link providing a copy of the knowledge-based data item to the third database user for display.

17. The non-transitory computer readable storage media of claim 16, wherein the method further comprises responsive to actuation of the second link displaying a second listing that identifies the second data object.

* * * * *